United States Patent [19]

Terazawa

[11] Patent Number: 4,829,959

[45] Date of Patent: May 16, 1989

[54] DEVICE FOR CONTROLLING A THROTTLE VALVE

[75] Inventor: Tadashi Terazawa, Toyota, Japan

[73] Assignee: Aisin Seiki Kabushiki Kaisha, Kariya, Japan

[21] Appl. No.: 184,905

[22] Filed: Apr. 22, 1988

[30] Foreign Application Priority Data

Apr. 23, 1987 [JP] Japan ................... 62-100423

[51] Int. Cl.$^4$ ............................................... B60K 31/00
[52] U.S. Cl. ..................................... 123/349; 180/197
[58] Field of Search ............... 123/399, 349, 400, 361, 123/376; 180/197; 318/52; 74/857, 866

[56] References Cited

U.S. PATENT DOCUMENTS

| | | | |
|---|---|---|---|
| 4,541,378 | 9/1985 | Kitamura | 123/399 X |
| 4,601,271 | 7/1986 | Ejiri et al. | 123/399 X |
| 4,622,936 | 11/1986 | Junyingor et al. | 123/399 |
| 4,703,823 | 11/1987 | Yogo et al. | 123/399 X |
| 4,714,864 | 12/1987 | Yogo et al. | 123/349 X |
| 4,721,176 | 1/1988 | Kabarin et al. | 180/197 |

Primary Examiner—Raymond A. Nelli
Attorney, Agent, or Firm—Finnegan, Henderson, Farabow, Garrett & Dunner

[57] ABSTRACT

A first input member (6) is rotatably mounted to a shaft (2). The first input member (6) is linked with an accelerator pedal (25). An output member (3) is tightly secured to the shaft (2). The output member (3) is linked with a throttle valve (24). An intermediate member (7) is also rotatably mounted to the shaft (2). The intermediate member (7) is linked with the output member by a spring member (8). The first input member (6) drives the output member (3) through the intermediate member (7) in response to an operation of the accelerator pedal (25). A driving means (11) is connected to the shaft (2) through the reduction mechanism (13). The driving means (11) rotates the shaft (2) and drives the output member (3) in order to open or close the throttle valve (24).

4 Claims, 2 Drawing Sheets

DEVICE FOR CONTROLLING A THROTTLE VALVE

FIELD OF THE INVENTION

This invention relates to a device for controlling a throttle valve which permits an closing of the throttle valve from a position demanded by an accelerator pedal.

BACKGROUND OF THE INVENTION

Japanese utility model laid open patent publication No. 68627/1980, which is published on May 12, 1980, discloses a device for controlling a throttle valve including a cruise controller and accelerator pedal. According to this conventional device, the throttle valve is controlled by the accelerator pedal and the cruise controller.

Accordingly, when the cruise controller is operated, the throttle valve is automatically controlled by the cruise controller without an operation of the accelerator pedal. Further, the throttle valve is opened from a position demanded by the cruise controller if the accelerator pedal is depressed largely. That means the throttle valve is located maximum opening position demanded by the accelerator pedal and the cruise controller.

By the way, it is not preferable for the vehicle to increase an engine power when the vehicle runs on an iced field. Because a needless engine power decreases a friction grip (friction force) between vehicle wheels and the iced field, and then, decreases a stabilization for a vehicle running.

Accordingly, it is preferable for the vehicle to decrease the needless engine power when the vehicle runs on the iced field. By decreasing the needless engine power, a difference between vehicle velocity and wheel speed is reduced and the friction grip is increased. Such control for engine power is called "traction control".

However, the conventional device for controlling the throttle valve can not close the throttle valve from the position demanded by the accelerator pedal. Therefore, if the needless engine power is demanded by the accelerator pedal, there are no way to reduce the needless engine power.

SUMMARY OF THE INVENTION

Accordingly, one of the object of the present invention is to provide an improved device for controlling a throttle valve which obviates the above conventional drawbacks.

Further, it is also an object of the present invention to close the throttle valve from a position demanded by an accelerator pedal.

Furthermore, it is an object of the present invention to transmit a movement of the throttle valve to an accelerator pedal.

To achieve the above objects, in the preferable embodiment of the present invention, a first input member (6) is rotatably mounted to a shaft (2). The first input member (6) is linked with an accelerator pedal (25). Further, an output member (3) is tightly secured to the shaft (2). The output member (3) is linked with a throttle valve (24). Furthermore, an intermediate member (7) is also rotatably mounted on the shaft (2). The intermediate member (7) is linked with the output member (3) by a spring member (8). The first input member (6) drives the output member (3) through the intermediate member (7) in response to an operation of the accelerator pedal (25). Meanwhile, a driving means (11) is connected to the shaft (2). The driving means (11) rotates the shaft (2) and drives the output member (3) in order to open or close the throttle valve (24).

The other objects and features will be apparent from following description referring to the accompanying figures.

DESCRIPTION OF THE PREFERRED EMBODIMENT

Figure 1:
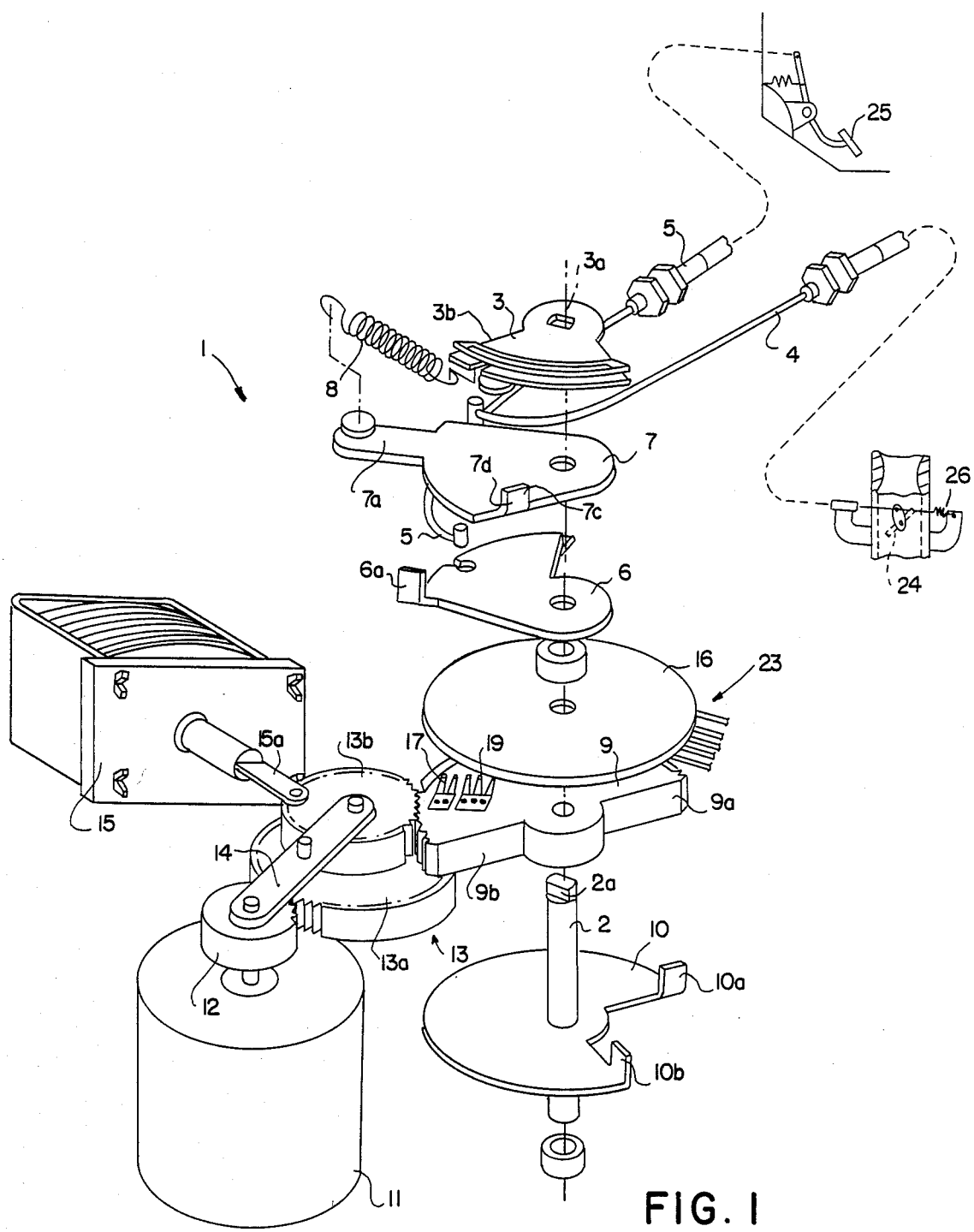
FIG. 1 shows a exploded perspective view showing a preferred embodiment of the present invention.

A device (1) for controlling the throttle valve has an output member (3) which is secured tightly to one end of a shaft (2). The output member (3) is secured to the shaft (2) by inserting a square hole (3a) on the output member (3) into a square portion (2a) at the end of the shaft (2). One end of a cable (4) is connected to the output member (3). The other end of the cable (4) is connected a throttle valve (24).

A first input member (6) is rotatably mounted on the shaft (2). The first input member (6) has a projection (6a) which is projected toward the output member (3). One end of a cable (5) is connected to the first input member (6). The other end of the cable (5) is connected to an accelerator pedal (25).

An intermediate member (7) is rotatably mounted on the shaft (2). The intermediate member (7) is disposed between the output member (3) and first input member (6). The intermediate member (7) is linked with the output member (3) by a spring (8). The intermediate member (7) has an arm (7a) and a projection (7c). The arm (7a) is extended toward a radial direction of the shaft (2) in order to contact with the projection (6a). The projection (7c) is projected toward the output member (3) in order to contact with a side (3b) of the output member (3).

The side (3b) of the output member (3) is in contact with a side face (7d) of the projection (7c). Accordingly, the projection (7c) limits the clockwise rotation of the output member (3) against a contractile force of the spring (8). When the intermediate member (7) rotates in the clockwise direction, the contact between the side face (3b) and the projection (7c) is held by the spring (8), then, the output member (3) rotates in the clockwise direction with the intermediate member (7) integrally. When the output member (3) rotates in the clockwise direction, the cable (4) is pulled.

Now, the normal operation of the device (1) is explained. The normal operation is defined that the throttle valve (24) is controlled by an accelerator pedal (25).

When the accelerator pedal (25) is moved or depressed by a driver of the vehicle, the cable (5) is pulled. At this time, the first input member (6) rotates around the shaft (2) in the clockwise direction, then the projection (6a) is brought into contact with the arm (7a). Therefore, the projection (6a) makes the intermediate member (7) rotate through the arm (7a). The intermediate member (7) rotates against the contractile force of the spring (8). At the same time, the output member (3) is rotated unitary or integrally with the intermediate member (7) by the spring (8). When the output member (3) is rotated with the intermediate member (7), the cable (4) is pulled, and then, the throttle valve (24) is opened corresponding to the movement of the accelerator pedal (25). When the accelerator pedal (25) is in free, the output member (3), the intermediate member (7) and the first input member (6) are returned to their original positions by a return spring (26) which must be provided on the throttle valve (24).

Next, the mechanism for automatic operation of the device (1) is explained. The automatic operation is defined that the throttle valve (24) is controlled by a cruise controller or a traction controller etc.

A second input member (9) is rotatably mounted on the shaft (2). The second input member (9) has a semi-circular shape and has a plurality of teeth on an outer circumference thereof. Further, a transmitting plate (10) is secured rigidly to the shaft (2). One pair of projections (10a) and (10b) is provided on the outer circumference of the transmitting plate (10). The projections (10a) and (10b) are projected towards the second input member (9). Therefore, the projections (10a) and (10b) are capable of contacting with sides (9a) and (9b) respectively.

A pinion gear (12) is secured rigidly to an output shaft of a driving device (11). The pinion gear (12) is meshed with an input gear (13a). An output gear (13b) is formed integrally with the input gear (13a). A reduction mechanism (13) is formed by the gears (13a) and (13b). The reduction mechanism (13) is rotatably mounted by a link (14) around the output shaft of the driving device (11). Therefore, the reduction mechanism (13) is capable of revolving around the pinion gear (12). An actuator (15) is coupled with the link (14). When the actuator (15) pushes the link (14), the reduction mechanism (13) is turned around the pinion gear (12), and then, the output gear (13b) is meshed with the second input member (9). When the actuator (15) is deenergized, the reduction gear (13) is separated from the second input member (9) by a spring (not shown).

When the cruise control is operated by the vehicle driver, the reduction mechanism (13) is meshed with the second input member (9) by the actuator (15). The driving device (11) is rotated in response to difference between a target vehicle velocity and an actual vehicle velocity. The second input member (9) is rotated through the reduction mechanism (13) in the clockwise direction by the rotation of the driving device (11). By the clockwise rotation of the second input member (9), the side (9a) is in contact with the projection (10a) on the transmitting plate (10). Then the transmitting plate (10) is rotated toward the clockwise direction. As the transmitting plate (10) is secured to the shaft (2), the shaft (2) is also rotated in the clockwise direction. Consequently, the output member (3) is rotated and the throttle valve (24) is opened. Thus, the throttle valve (24) is opened in response to the difference between the target vehicle velocity and the actual vehicle velocity, and, the cruise control is obtained. Under this situation, the side face (3b) of the output member (3) is in contact with the projection (7c) on the intermediate member (7). Then the intermediate member (7) is rotated. In accordance with the rotation of the intermediate member (7), the arm (7a) is separated from the projection (6) on the first input member (6).

When the accelerator pedal (25) is moved or depressed largely under cruise control, the projection (6a) on the first input member (6) is in contact with the arm (7) of the intermediate member (7). Then the intermediate member (7) is rotated. As the clockwise rotation of the intermediate member (7) rotates the output member (3), the throttle valve (24) is opened largely. Under this situation, the projection (10a) on the transmitting plate (10) is separated or moved away from the side (9a). When the accelerator pedal (25) is in free, the output member (3) is rotated in counter-clockwise direction by the spring (26) which must be provided on the throttle valve (24). The output member (3) stops thee rotation when the projection (10a) on the transmitted plate (10) is in contact with the side (9a) of the second input member (9).

If the cruise control is terminated by the vehicle driver, the actuator (15) is deenergized. Then the reduction mechanism (13) is separated from the second input member (9). Thus, the normal operation is obtained.

When the traction control is requested by the vehicle driver, the reduction mechanism (13) is meshed with the second input member (9) by the actuator (15). When the needless engine power is detected, the driving device (11) makes the second input member (9) rotate through the reduction mechanism (13) in the counter-clockwise direction.

By the counter-clockwise rotation of the second input member (9), the side 9b is in contact with the projection (10b) on the transmitting plate (10). Then the transmitting plate (10), the shaft (2) and the output member (3) are rotated in the counter-clockwise direction. The counter-clockwise rotation of the output member (3) makes the throttle valve (24) close. Consequently, the needless engine power is reduced. Under this situation, even if the first input member (6) and the intermediate member (7) are rotated in the clockwise direction by the movement of the accelerator pedal (25), the rotation of the intermediate (7) is absorbed by the spring (8). As a result, the output member (3) is not rotated by the accelerator pedal (25). This means that a clockwise torque transmitted to the output member (3) from the intermediate member (7) is not sufficient to rotate the second input member (9) and reduction mechanism (13) in the clockwise direction.

The device (1) further includes an angle detection mechanism (23) for detecting the rotating angle of the second input member (9). The angle detection mechanism (23) includes a plate (16). The plate (16) is faced to the second input member (9). Further, a first brash (17) and a second brash (18) are fixed to the second input member (9). The first brash (17) has two electrodes which are electrically connected with each other. The second brash (19) has three electrodes which are electrically connected together.

Figure 2:
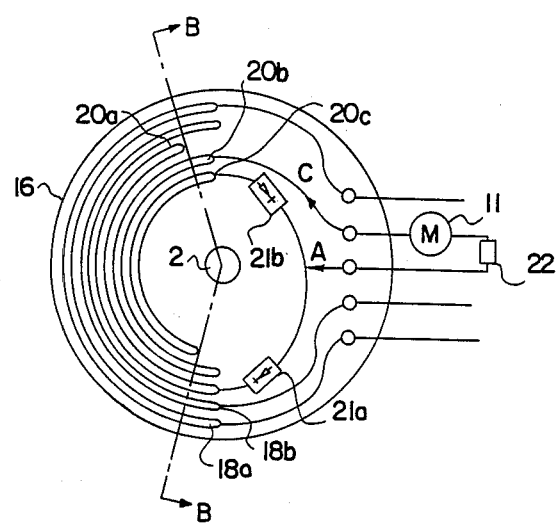
FIG. 2 shows a plane view showing a control plate according to the preferred embodiment of the present invention.

A shown in FIG. 2, the plate (16) has an arc shaped resistor (18a) and an arc shaped conductor (18b) which are printed to the plate (16). The electrodes of the brash (17) are in contact with the resistor (18a) and the conductor (18b). D.C. voltage is applied to both ends of the resistor (18a). Accordingly, the rotational angle of the second input member (9) is converted into the divided voltage and is transmitted to the conductor (18b). Therefore, the rotational angle of the second input member (9) is detected by the outputs from the conductor (18b).

The second input member (9) may be rotated too much by the driving device (11) for some reasons. When the driving device (11) drives the second input member too much, the driving device (11) should be deenergized automatically. The plate (16) further has three arc shaped conductors (20a), (20b) and (20c). The electrodes of the brash (19) are in contact with the conductors (20a), (20b) and (20c). The conductors (20a) and (20c) are connected to an electric power supply (22) through diodes (21a) and (21b). The conducting directions of the diodes (21a) and (21b) are in opposite each other. Further, the conductor (20b) is connected to the electric power supply (22) through the driving device (11). For example, when the electric power supply (22) supplies an electric power toward direction (A), an electric current flows through the diode (21a), the conductor (20a), the second brash (19), the conductor (20b) and the driving device (11). Then the driving circuit (11) moves the pinion gear (12) in response to the supplied electric power, and the second brush (19) is rotated in the clockwise direction in FIG. 2. However, when the second brush (19) is entered into range (B) on the plate (16), the electrical connection between the second brash (19) and the conductor (20a) is cut off. Consequently, the driving device (11) is deenergized. At this time, the driving device (11) can be reversed by supplying the electric power toward the direction (C). As same as the above example, when the electric power is supplied to the direction (C) and the second brush (19) is entered into range (B), the driving device (11) can be reversed by supplying the electric power toward direction (A).

According to the device (1), the accelerator pedal (25) is linked with the throttle valve (24) by the spring (8). Therefore, the accelerator pedal (25) is always connected to the throttle valve (24). Accordingly, a clutch mechanism is not required between the accelerator pedal (25) and the throttle valve (24).

Further, when the throttle valve (24) is closed by the driving device (11) under the traction control, outputs of the driving device (11) are partially transmitted to the accelerator pedal (25). Therefore, the vehicle driver feels the operation of the traction control through the accelerator pedal (25).

What is claimed is:
1. A device for controlling a throttle valve comprising:
   a first input member linked with an accelerator pedal;
   an output member linked with said throttle valve
   an intermediate member disposed between said first input member and said output member;
   a shaft for supporting said output member non-rotatably and for supporting said intermediate member and first input member rotatably;
   a spring member for connecting said output member to said intermediate member;
   a transmitting member for transmitting the one-way rotation of said first input member to said intermediate member;
   a second input member rotatably mounted on said shaft;
   a transmitting plate member secured to said shaft;
   a reduction member selectively engaged with said second input member; and;
   a driving means for driving said reduction member;
   an actuator means linked with said reduction member for engaging said reduction member to second input member.
2. A device for controlling a throttle valve according to claim 1 wherein said spring means makes said output member contact with said intermediate means and said output member is capable of rotating against the spring means.
3. A device for controlling a throttle valve according to claim 2 further comprises;
   a link member for connecting said reduction mechanism to said driving means;
   wherein said reduction member is turned around said driving means.
4. A device for controlling a throttle valve according to claim 2 further comprises;
   a limiting means for limiting a rotation of said driving means at predetermined angle.

* * * * *